US010185889B2

(12) United States Patent
Miyamori

(10) Patent No.: US 10,185,889 B2
(45) Date of Patent: Jan. 22, 2019

(54) TERMINAL DEVICE, DIAGNOSIS SYSTEM AND COMPUTER READABLE MEDIUM FOR IDENTIFICATION AND ANALYSIS OF IMAGE UNEVENNESS

(71) Applicant: FUJI XEROX CO., LTD., Tokyo (JP)

(72) Inventor: Shinya Miyamori, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/220,936

(22) Filed: Jul. 27, 2016

(65) Prior Publication Data

US 2017/0228612 A1   Aug. 10, 2017

(30) Foreign Application Priority Data

Feb. 8, 2016   (JP) .................................. 2016-021721

(51) Int. Cl.
 *G06K 9/00*   (2006.01)
 *G06K 9/52*   (2006.01)
 (Continued)

(52) U.S. Cl.
 CPC ............. *G06K 9/522* (2013.01); *G06K 9/033* (2013.01); *G06K 9/036* (2013.01); *G06T 7/0004* (2013.01);
 (Continued)

(58) Field of Classification Search
 None
 See application file for complete search history.

(56) References Cited

U.S. PATENT DOCUMENTS

| 5,663,569 A * | 9/1997 | Hayano .................. G01N 21/94 250/559.06 |
| 6,275,600 B1 * | 8/2001 | Banker .................. G06K 15/00 358/406 |

(Continued)

FOREIGN PATENT DOCUMENTS

| JP | 2003-5298 A | 1/2003 |
| JP | 2010-91723 A | 4/2010 |

OTHER PUBLICATIONS

Rawashdeh, N. A., Martinez, Ó., Quiroga, M., & Donohue, K. D. (Mar. 2007). Characterization of printer banding in regions of complex image content. In SoutheastCon, 2007. Proceedings. IEEE (pp. 433-438). IEEE.*

(Continued)

*Primary Examiner* — Vu Le
*Assistant Examiner* — Samah A Beg
(74) *Attorney, Agent, or Firm* — Sughrue Mion, PLLC

(57) ABSTRACT

A terminal device includes: an acquiring unit that acquires image information; a displaying unit that displays the image information acquired by the acquiring unit; a receiving unit that receives an analysis position of image-quality unevenness from the image information displayed by the displaying unit; a detecting unit that detects pitch information by performing frequency analysis of the image information received by the receiving unit; a controlling unit that controls the displaying unit to display the pitch information detected by the detecting unit; and a storing unit that stores, as history information, the image information and the pitch information in association with the analysis position. The controlling unit controls the displaying unit to display the analysis position stored in the storing unit.

6 Claims, 19 Drawing Sheets

(51) Int. Cl.
*G06K 9/03* (2006.01)
*H04N 5/232* (2006.01)
*G06T 7/00* (2017.01)
*G06T 7/90* (2017.01)

(52) U.S. Cl.
CPC ........... *H04N 5/23293* (2013.01); *G06T 7/90* (2017.01); *G06T 2207/10024* (2013.01); *G06T 2207/20056* (2013.01); *G06T 2207/30144* (2013.01)

(56) References Cited

U.S. PATENT DOCUMENTS

| | | | | |
|---|---|---|---|---|
| 6,504,625 | B1* | 1/2003 | Amero | B41J 2/2135 358/1.9 |
| 6,571,000 | B1* | 5/2003 | Rasmussen | G06K 9/036 358/1.9 |
| 6,597,473 | B1* | 7/2003 | Rasmussen | H04N 1/00002 358/1.9 |
| 6,665,425 | B1* | 12/2003 | Sampath | H04N 1/00002 358/1.15 |
| 6,862,414 | B2* | 3/2005 | Sampath | G03G 15/5062 382/112 |
| 7,054,017 | B2* | 5/2006 | Terrill | G06K 5/02 345/611 |
| 7,382,507 | B2* | 6/2008 | Wu | H04N 1/40 347/19 |
| 7,855,806 | B2* | 12/2010 | Paul | G06K 15/00 347/19 |
| 8,223,385 | B2* | 7/2012 | Minhas | G06T 7/001 358/1.18 |
| 9,063,742 | B1* | 6/2015 | Bienkowski | G06F 8/71 |
| 9,143,629 | B2* | 9/2015 | Wilsher | H04N 1/00045 |
| 9,731,500 | B2* | 8/2017 | Schumann | B41F 33/0036 |
| 2001/0055503 | A1* | 12/2001 | Kin | G03G 15/065 399/284 |
| 2003/0142985 | A1 | 7/2003 | Sampath et al. | |
| 2005/0286742 | A1* | 12/2005 | Rasmussen | B41J 29/393 382/112 |
| 2006/0103899 | A1 | 5/2006 | Wu | |
| 2009/0274342 | A1* | 11/2009 | Wu | B41J 29/393 382/112 |
| 2010/0020360 | A1* | 1/2010 | Kim | H04N 1/00002 358/406 |
| 2011/0019245 | A1 | 1/2011 | Adachi | |
| 2011/0052010 | A1 | 3/2011 | Xu et al. | |
| 2011/0102772 | A1* | 5/2011 | Bloss | G07D 7/122 356/71 |
| 2011/0243393 | A1* | 10/2011 | Berkovich | G06T 7/0004 382/112 |
| 2011/0299099 | A1* | 12/2011 | Xu | H04N 1/6036 358/1.9 |
| 2013/0170745 | A1* | 7/2013 | Masuda | G06K 9/036 382/165 |
| 2014/0341437 | A1* | 11/2014 | Araki | G06T 7/001 382/112 |
| 2015/0055184 | A1* | 2/2015 | Lin | H04N 1/405 358/3.06 |
| 2015/0170351 | A1* | 6/2015 | Kobayashi | G06T 7/0002 382/165 |
| 2015/0195487 | A1* | 7/2015 | Liu | H04N 7/0132 348/447 |
| 2015/0249810 | A1* | 9/2015 | Sasaki | H04N 9/643 345/589 |
| 2016/0165142 | A1* | 6/2016 | Hada | H04N 5/23293 348/211.1 |
| 2016/0342868 | A1* | 11/2016 | Miyamori | G06K 15/402 |
| 2017/0190194 | A1* | 7/2017 | Zollner | B41J 29/393 |
| 2017/0230517 | A1* | 8/2017 | Miyamori | G06F 3/0488 |
| 2017/0230518 | A1* | 8/2017 | Miyamori | G06K 9/36 |
| 2017/0230519 | A1* | 8/2017 | Miyamori | H04N 1/00029 |

OTHER PUBLICATIONS

Briggs, J. C. Murphy, M., & Pan, Y. (Mar. 2000). Banding characterization for inkjet printing. In IS and TS PICS Conference (pp. 84-88). Society for Imaging Science & Technology.*

Communication issued by the Australian Patent Office dated Sep. 21, 2017 in counterpart Australian Patent Application No. 2016225824.

* cited by examiner

FIG. 5

| MODEL NAME : ABC001 | |
|---|---|
| PITCH (mm) | CAUSE COMPONENT OF BANDING |
| PITCH 1 | DEVELOPING ROLL |
| PITCH 2 | PHOTOSENSITIVE MEMBER |
| ⋮ | ⋮ |
| PITCH 30 | TRANSPORT ROLL |

(MODEL NAME : ABC002, MODEL NAME : ABC003 — additional layered tables)

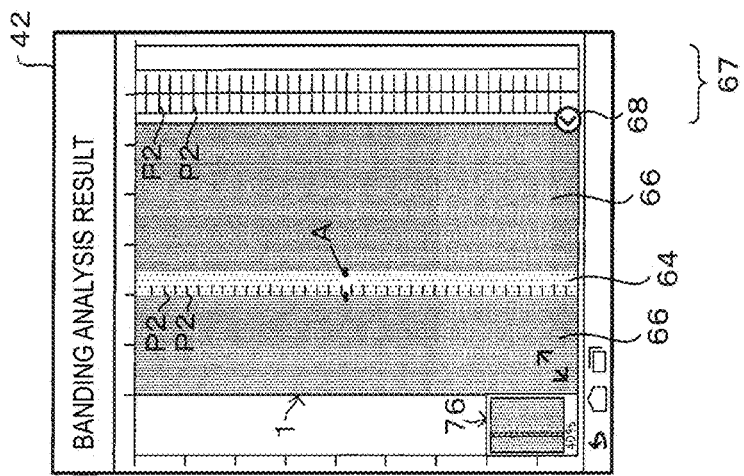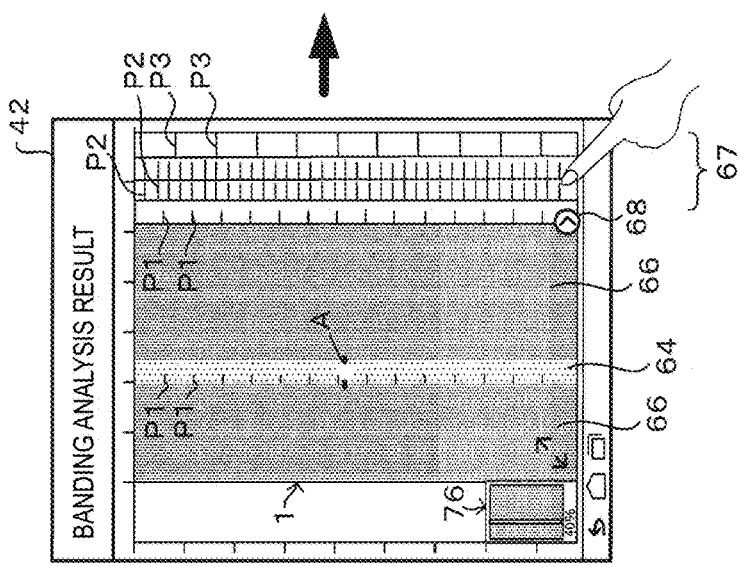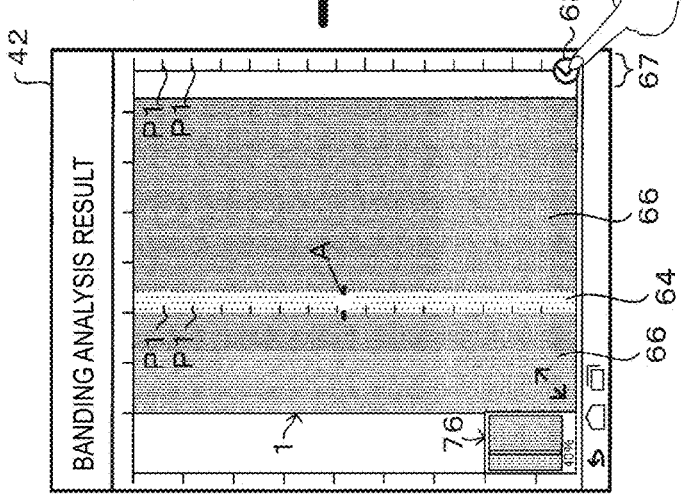

TERMINAL DEVICE, DIAGNOSIS SYSTEM AND COMPUTER READABLE MEDIUM FOR IDENTIFICATION AND ANALYSIS OF IMAGE UNEVENNESS

CROSS-REFERENCE TO RELATED APPLICATIONS

This application is based on and claims priority under 35 USC 119 from Japanese Patent Application No. 2016-021721 filed Feb. 8, 2016.

BACKGROUND

The present invention relates to a terminal device, a diagnosis system and a computer readable medium.

SUMMARY

According to an aspect of the invention, there is provided a terminal device comprising: an acquiring unit that acquires image information; a displaying unit that displays the image information acquired by the acquiring unit; a receiving unit that receives an analysis position of image-quality unevenness from the image information displayed by the displaying unit; a detecting unit that detects pitch information by performing frequency analysis of the image information received by the receiving unit; a controlling unit that controls the displaying unit to display the pitch information detected by the detecting unit; and a storing unit that stores, as history information, the image information and the pitch information in association with the analysis position, wherein the controlling unit controls the displaying unit to display the analysis position stored in the storing unit.

BRIEF DESCRIPTION OF THE DRAWINGS

Exemplary embodiments of the present invention will be described in detail based on the following figures, wherein:

FIG. 5 is a diagram illustrating an instance of information stored in a pitch data storage section 50 in FIG. 4;

FIGS. 13A to 13C are diagrams illustrating instances of display screens for describing a conversion operation for the banding analysis result according to the exemplary embodiment of the invention;

DETAILED DESCRIPTION

Hereinafter, exemplary embodiments of the invention will be described in detail with reference to the drawings.

Figure 1:
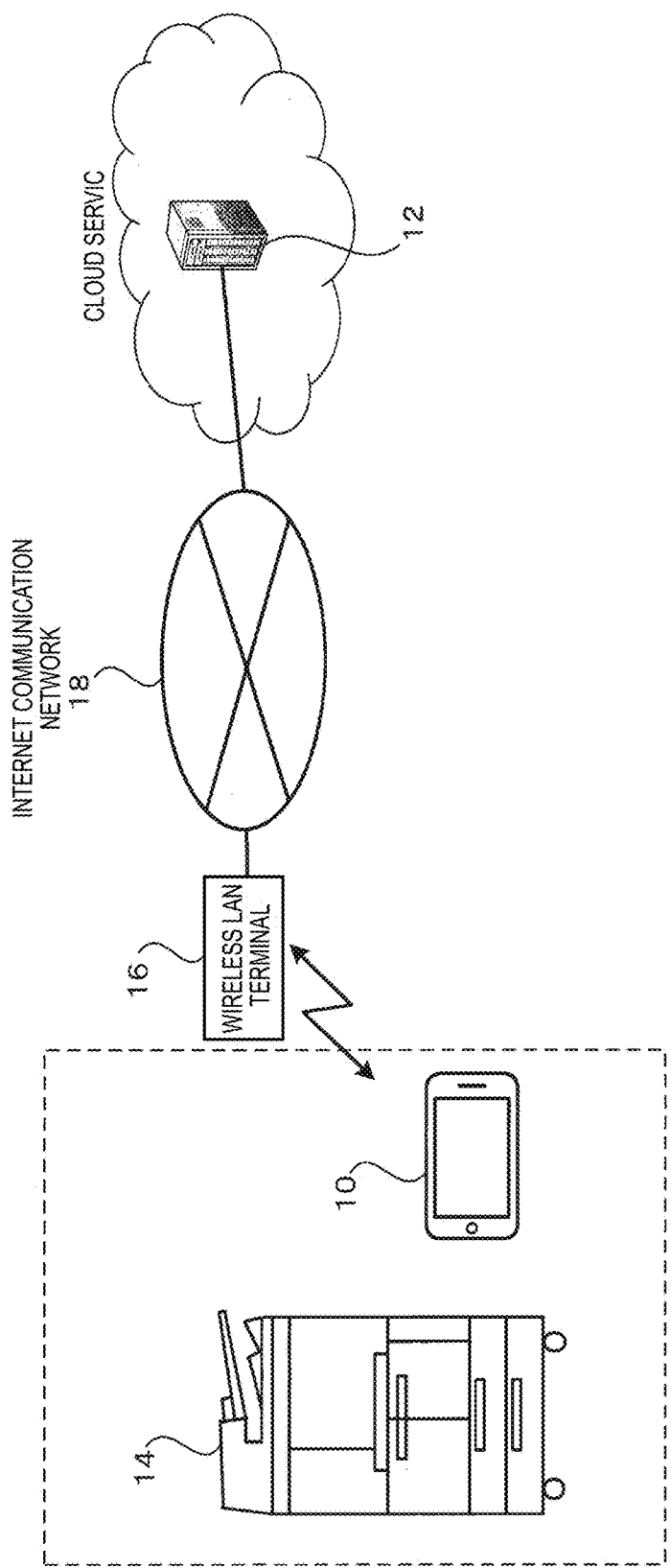
FIG. 1 is a system diagram illustrating the configuration of a banding diagnosis system according to an exemplary embodiment of the invention.

FIG. 1 is a system diagram illustrating the configuration of a banding diagnosis system according to an exemplary embodiment of the invention.

As illustrated in FIG. 1, the banding diagnosis system according to the exemplary embodiment of the invention is configured to include a portable terminal device 10 such as a personal computer, a smart phone, or a tablet terminal device and a server apparatus 12.

Any terminal device is applicable to the invention, as long as the terminal device 10 can be connected to the server apparatus 12 through a communication network. However, in the exemplary embodiment, the description will be made using a case where the terminal device 10 is an apparatus capable of acquiring image information and a tablet terminal device including a touch panel on which a touch input is enabled.

The terminal device 10 is carried by a service engineer (maintenance personnel) who maintains or repairs an image forming apparatus 14 such as a printer which is used by an end user and is used to acquire image information received from the image forming apparatus 14 and to analyze the frequency of the acquired image information or display a banding analysis result obtained from a frequency analysis result acquired from the server apparatus 12.

The terminal device 10 and the server apparatus 12 are connected through a wireless LAN terminal 16 such as a Wi-Fi router or an Internet communication network 18 to transmit and receive information.

When the terminal device 10 is a mobile phone device or a smart phone, the terminal device 10 and the server apparatus 12 can also be connected through a mobile phone line network to transmit and receive defect information.

In the banding diagnosis system according to the exemplary embodiment, when banding occurs in the image forming apparatus 14 which is a target electronic apparatus installed in a place of the end user, a service engineer goes to the place of the image forming apparatus 14 with the terminal device 10. The service man uses the terminal device 10 to acquire image information obtained by using an image painted with each color of cyan (C), magenta (M), yellow (Y), and black (K) at given concentrations as an original and causing a reading apparatus to read the original, and then executes bending diagnosis to specify a cause of the banding.

Figure 2:
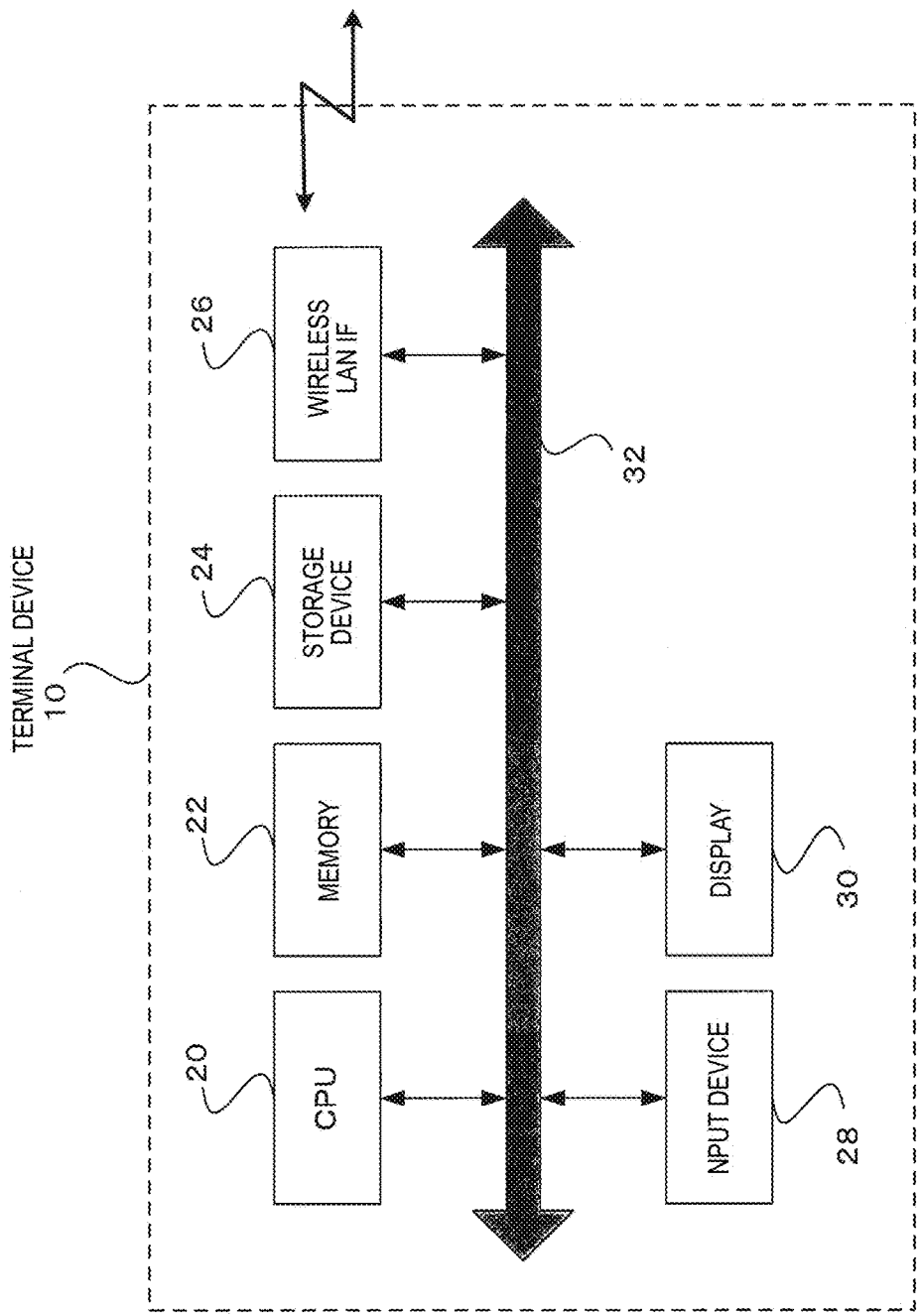
FIG. 2 is a block diagram illustrating a hardware configuration of a terminal device 10 according to the exemplary embodiment of the invention.

Next, a hardware configuration of the terminal device 10 in the banding diagnosis system according to the exemplary embodiment is illustrated in FIG. 2.

As illustrated in FIG. 2, the terminal device 10 includes a CPU 20, a memory 22 that can temporarily store data, a storage device 24 such as a flash memory, a wireless LAN interface (IF) 26 that performs wireless communication with the wireless LAN terminal 16 to transmit and receive data, an input device 28 such as a touch sensor, and a display device 30. Those components are interconnected through a control bus 32.

The terminal device 10 according to the exemplary embodiment includes a touch panel 28 in which a touch sensor for detecting a touch position on the display device 30 is provided as an input device, and thus display is performed and input is performed by the user, using the touch panel.

The CPU 20 executes a predetermined process based on a control program stored in the memory 22 or the storage device 24 and controls an operation of the terminal device 10. The control program can also be obtained by being downloaded through the Internet communication network 18 or a mobile phone line network and provided to the CPU 20, or the control program can also be provided to the CPU 20 by being stored in a storage medium such as a CD-ROM.

When the control program described above is executed, the terminal device 10 according to the exemplary embodiment performs an operation to be described below and supports service engineer's operation for specifying the cause of the banding.

Figure 3:
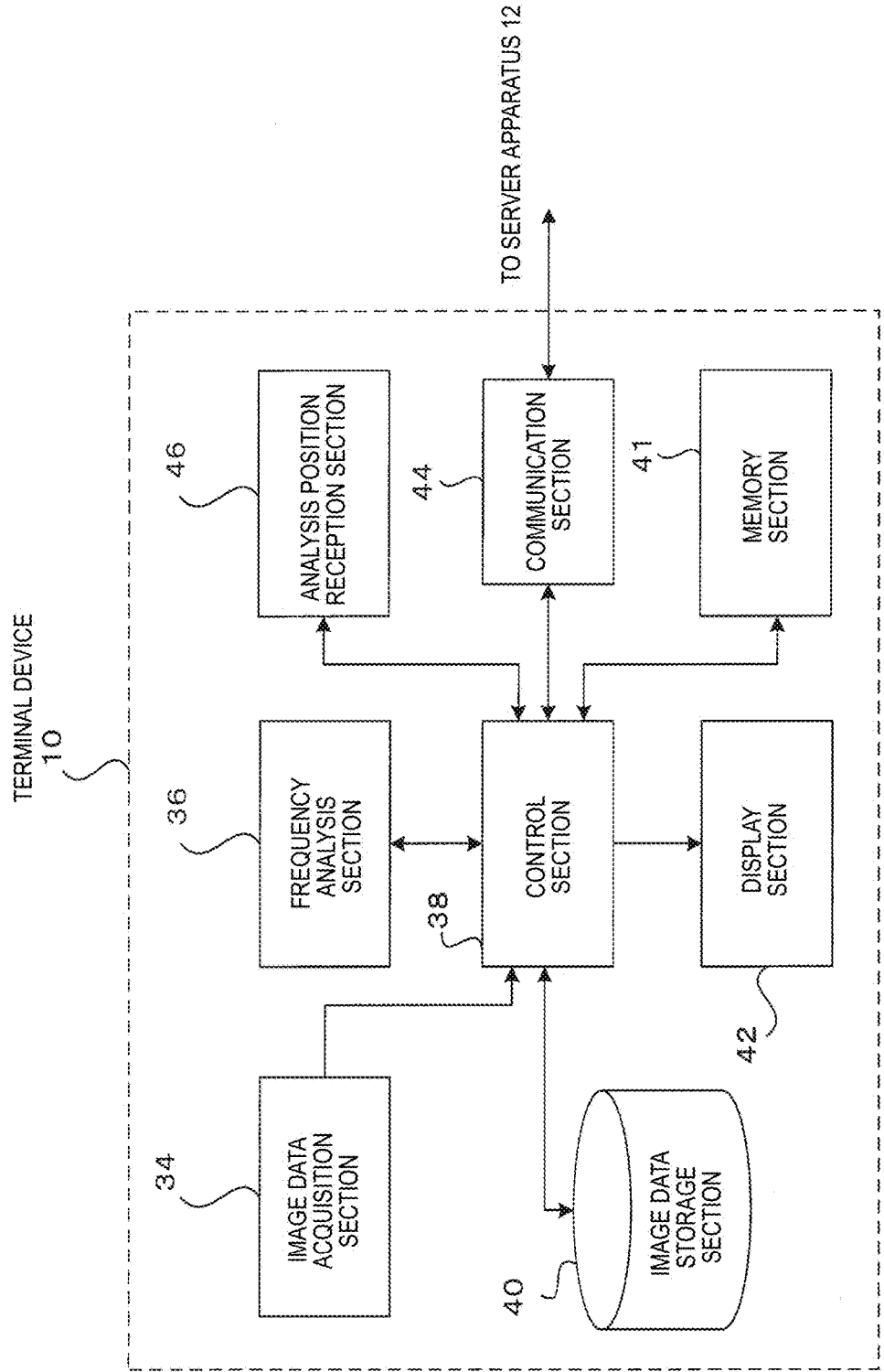
FIG. 3 is a block diagram illustrating a functional configuration of the terminal device 10 according to the exemplary embodiment of the invention.

FIG. 3 is a block diagram illustrating a functional configuration of the terminal device 10 which is realized by the execution of the control program.

As illustrated in FIG. 3, the terminal device 10 according to the exemplary embodiment includes an image data acquisition section 34, a frequency analysis section 36, a control section 38, an image data storage section 40, a memory 41, a display 42, a communication section 44, and an analysis position reception section 46.

The image data acquisition section 34 acquires image data of each color of cyan (C), magenta (M), yellow (Y), and black (K) transmitted from the image forming apparatus 14 which is an analysis target apparatus.

The display 42 displays various kinds of data based on the control of the control section 38.

The communication section 44 communicates with the server apparatus 12 which is an external device.

The analysis position reception section 46 receives a coordinate position as an analysis position at which banding analysis is executed through designation of the user. The banding analysis is executed centering on the analysis position.

The image data storage section 40 stores plural pieces of image data obtained by causing the reading apparatus to read print chart originals of CMYK and information regarding the period and frequency of an image for which the image data is obtained by the frequency analysis section 36.

The memory 41 stores the image data, pitch information detected from the image data through analysis of the frequency analysis section 36, and a coordinate position serving as the analysis position detected by the frequency analysis section 36 as history information in association therewith.

The frequency analysis section 36 executes fast Fourier transform (FFT) on the image data acquired by the image data acquisition section 34 in a transport direction in a region containing the analysis position received by the analysis position reception section 46.

The control section 38 executes control such that the image data of the colors acquired by the image data acquisition section 34 is displayed on the display 42. Then, a banding analysis process of analyzing image-quality unevenness (banding) is executed on the colors of CMYK in sequence.

In the exemplary embodiment, to analyze the image-quality unevenness (banding) of the image output by the image forming apparatus such as a printer, plural pieces of image data obtained by using an image (print chart) painted with only one color of CMYK at a given concentration and output to a sheet by the image forming apparatus 14 as an original and causing the reading apparatus to read the print chart originals of CMYK are set as targets of the banding analysis process. The image data which is the target of the banding analysis process may be image data transmitted from the image forming apparatus 14 or the server apparatus 12 or may be image data preserved in advance in the image data storage section 40 of the terminal device 10.

Figure 10:
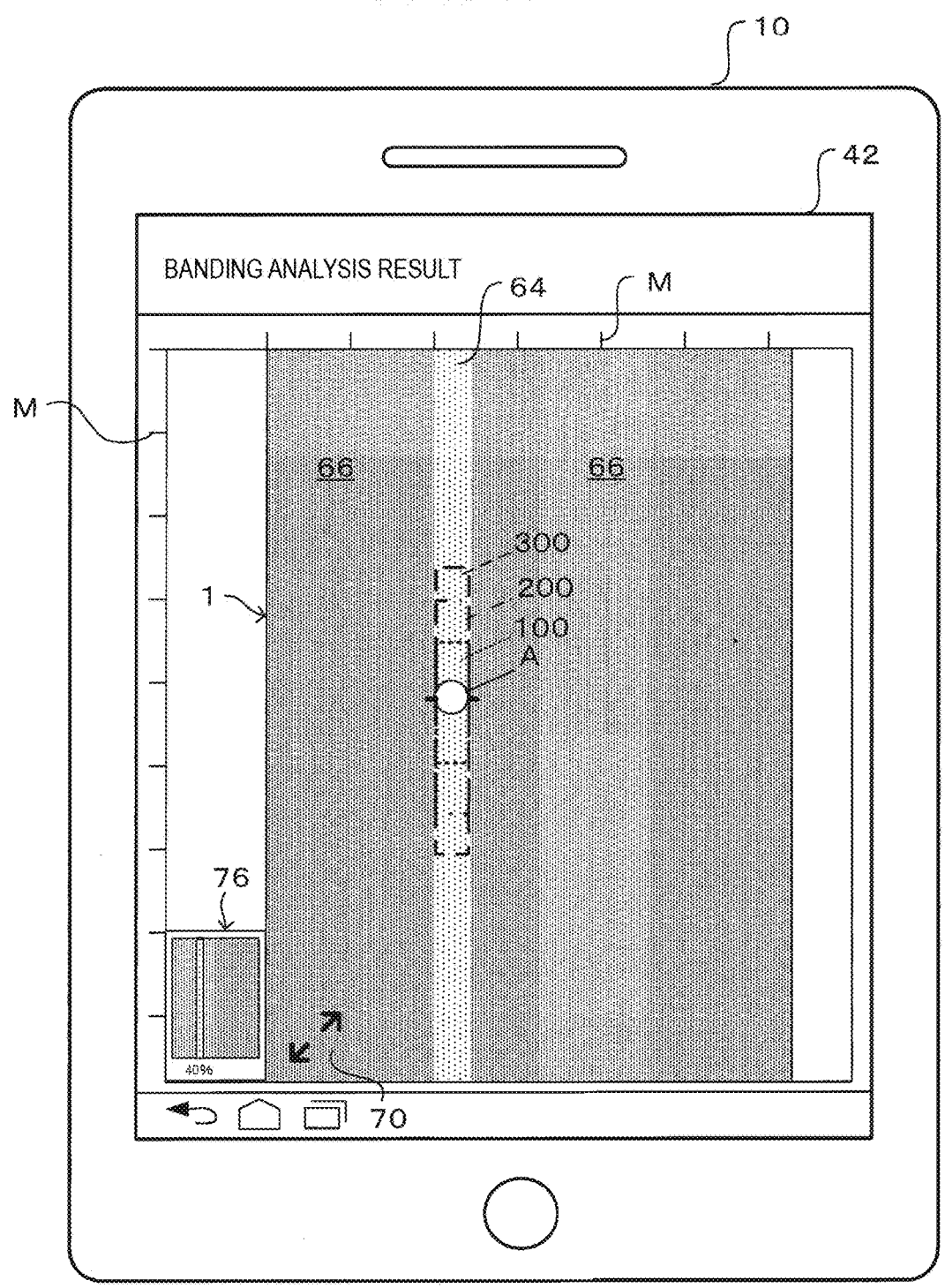
FIG. 10 is a diagram illustrating a region in which fast Fourier transform is executed in the banding diagnosis system according to the exemplary embodiment of the invention.

As illustrated in FIG. 10, the control section 38 executes control such that a designated region 64 which is a line containing an analysis position A received by the analysis position reception section 46 and other designated regions 66 are displayed with shade in a mask manner. Specifically, the designated region 64 is displayed with a brighter color than the undesignated regions 66. Accordingly, the analysis position A is expressed clearly. Control is executed such that the fast Fourier transform is executed on the image data of regions (ranges) in a small range 100 which is a first region centering on the analysis position A and contains the analysis position A, an intermediate range 200 which is a second region and contains the analysis position A, and a large range 300 which is a third region and contains the analysis position A, and the pitch information is detected from the information regarding the frequency and the period of the image which is each analysis result. Control is executed such that information regarding the frequency and the period of the image obtained by the frequency analysis section 36 is stored in the image data storage section 40 along with the image data. Then, the control section 38 executes control such that a banding analysis result obtained from the analysis result of the fast Fourier transform is displayed on the display 42 which is a touch panel.

Specifically, when the user executes a touch operation of touching a region in which image-quality unevenness is estimated to occur with his or her finger in the banding analysis result displayed on the display 42 which is the touch panel, the control section 38 receives region designation executed only within the ranges, the small range, 100, the intermediate range 200, and the large range 300, centering on the designated analysis position A based on the touch operation by the user.

Then, the control section 38 instructs the frequency analysis section 36 to perform the fast Fourier transform of analyzing frequency in the transport direction in a designated range (region). Therefore, the frequency analysis section 36 performs the fast Fourier transform in the transport direction with respect to a frequency component included in the designated region.

The control section 38 detects pitch information from the analysis result of the fast Fourier transform in the frequency analysis section 36 and extracts a pitch of a component predicted as a cause of banding.

The control section 38 transmits the pitch information regarding the component predicted as the cause of the acquired banding to the server apparatus 12 through the communication section 44 along with a model name of the image forming apparatus 14, model information such as a serial number, and operation state information indicating an operation state of the image forming apparatus 14. Specifically, the operation state information can include information regarding a kind of use sheet and information regarding whether the acquired image is cyan (C), magenta (M), yellow (Y), or black (K). In this way, the control section 38 transmits the pitch information due to the information regarding the frequency and the period obtained by the frequency analysis section 36 to the server apparatus 12 through the communication section 44.

The server apparatus 12 extracts the pitch information of the image data transmitted from the terminal device 10, retrieves the cause component of banding from the extracted pitch information, and transmits the cause component of banding to the terminal device 10.

Then the control section 38 executes control such that information regarding the cause component of banding extracted based on the pitch information and received from the server 12 is displayed as a banding analysis result on the display 42.

When there are plural banding analysis results received from the server apparatus 12, the control section 38 executes control such that the banding analysis results are preferentially received and displayed in order of greater banding on the display 42.

Here, the frequency analysis section 36 detects the frequencies and the periods of the small range 100, the intermediate range 200, and the large range 300 and detects the pitch information based on the information regarding the frequencies and the periods. The control section 38 preferentially displays the pitch information and the cause component on a screen based on an optimum analysis result among all of the analysis results of the small range 100, the intermediate range 200, and the large range 300.

Here, the smaller the analysis region is, the better precision of the analysis result is. However, when the frequency and the period are large (when a pitch is large), an appropriate result may not be obtained in the small range 100 or the intermediate range 200 in some cases. When the large range is sufficiently larger than the small range in the analysis region and the analysis is executed by moving the analysis region only in a sub-scanning direction (a time-axis direction or a transport direction) with a main scanning direction fixed, the analysis region is not moved in the sub-scanning direction in the large range. Therefore, a detected long period pitch is not changed in some cases. However, since the analysis region is smaller than an image size in the small range, the analysis can be executed by changing the sub-scanning direction. Therefore, the analysis range is minutely tracked and a detected pitch is changed according to a location. That is, after all of the regions of the small range 100, the intermediate range 200, and the large range 300 are analyzed, the optimum analysis result is preferentially extracted.

The control section 38 has an adjustment display function of executing control such that the shade of the acquired image information and analysis result on a display screen are adjusted and displayed on the display 42. The control section 38 has an operation lock function of executing control such that the display 42 is not operated. The control section 38 has a movement lock function of executing control such that display positions of the image information and the analysis result on the display 42 are not moved.

Next, a functional configuration of the server apparatus 12 in the banding analysis system according to the exemplary embodiment will be described with reference to the block diagram of FIG. 4.

Figure 4:
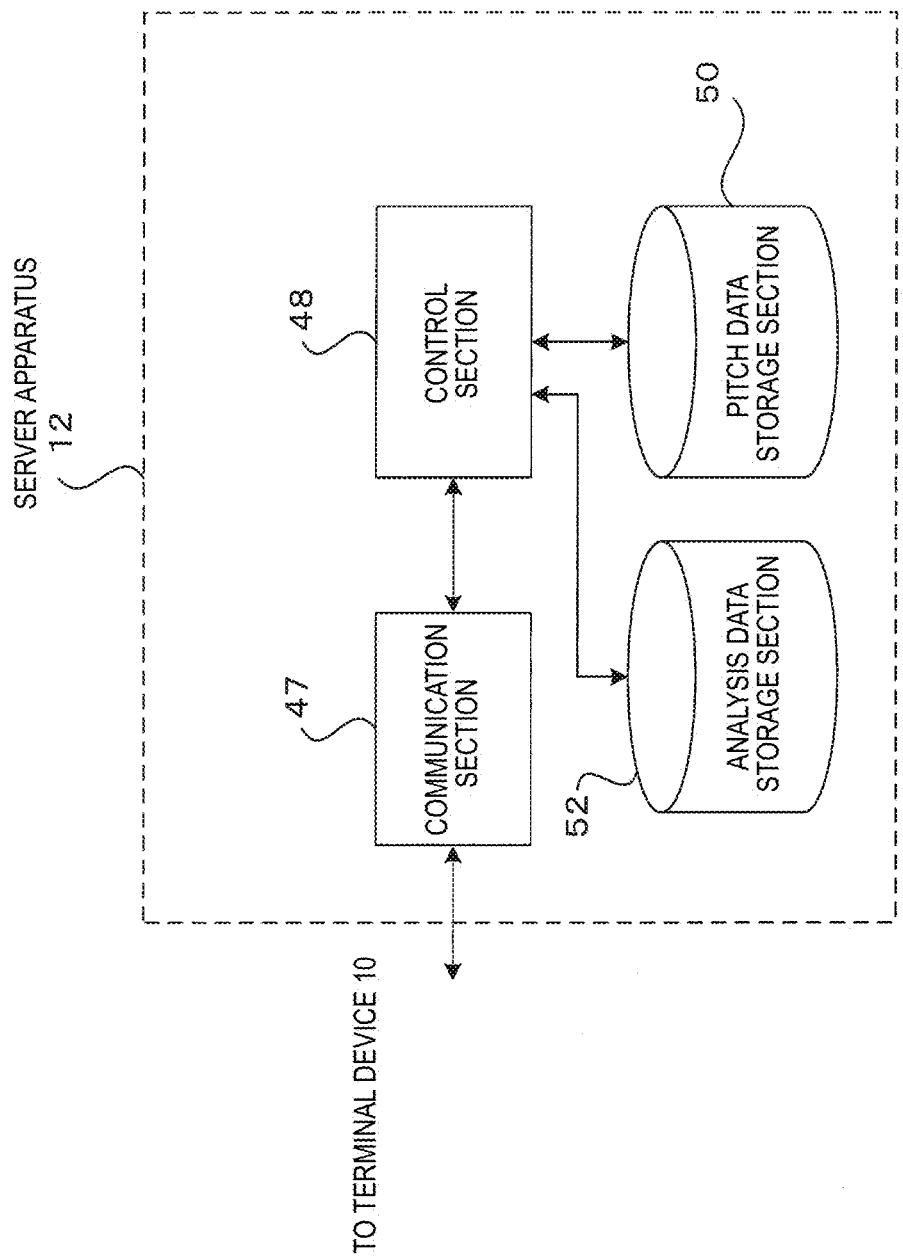
FIG. 4 is a block diagram illustrating a functional configuration of a server apparatus 12 according to the exemplary embodiment of the invention.

As illustrated in FIG. 4, the server apparatus 12 according to the exemplary embodiment includes a communication section 47, a control section 48, a pitch data storage section 50, and an analysis data storage section 52.

As illustrated in FIG. 5, the pitch data storage section 50 stores pitch information regarding the pitch of a component used in the image forming apparatus 14 and information regarding a cause component of banding estimated from the pitch for each model.

The analysis data storage section 52 stores a previously acquired banding analysis image, a coordinate position which is an analysis position at which the analysis image is acquired, the analysis result, and information regarding an operation state or the like of the apparatus at the time of analysis for each model.

When the pitch information of the analysis image is received from the terminal device 10, the control section 48 extracts the corresponding pitch information among plural pieces of data stored in the pitch data storage section 50, detects components which are the cause components of banding based on the pitch information, and transmits the components preferentially from the component which has a higher possibility of being the cause component of banding to the terminal device 10 via the communication section 47.

In the exemplary embodiment, the terminal device 10 executes the fast Fourier transform on the image data and transmits the pitch information based on the information regarding the frequency and the period of the image data to the server apparatus 12, as described above. However, the fast Fourier transform may be executed on the side of the server apparatus 12.

In this case, the server apparatus 12 includes the frequency analysis section 36, image data is transmitted from the terminal device 10 to the server apparatus 12 without transform, and the fast Fourier transform is executed on the image data in the server apparatus 12.

Figure 6:
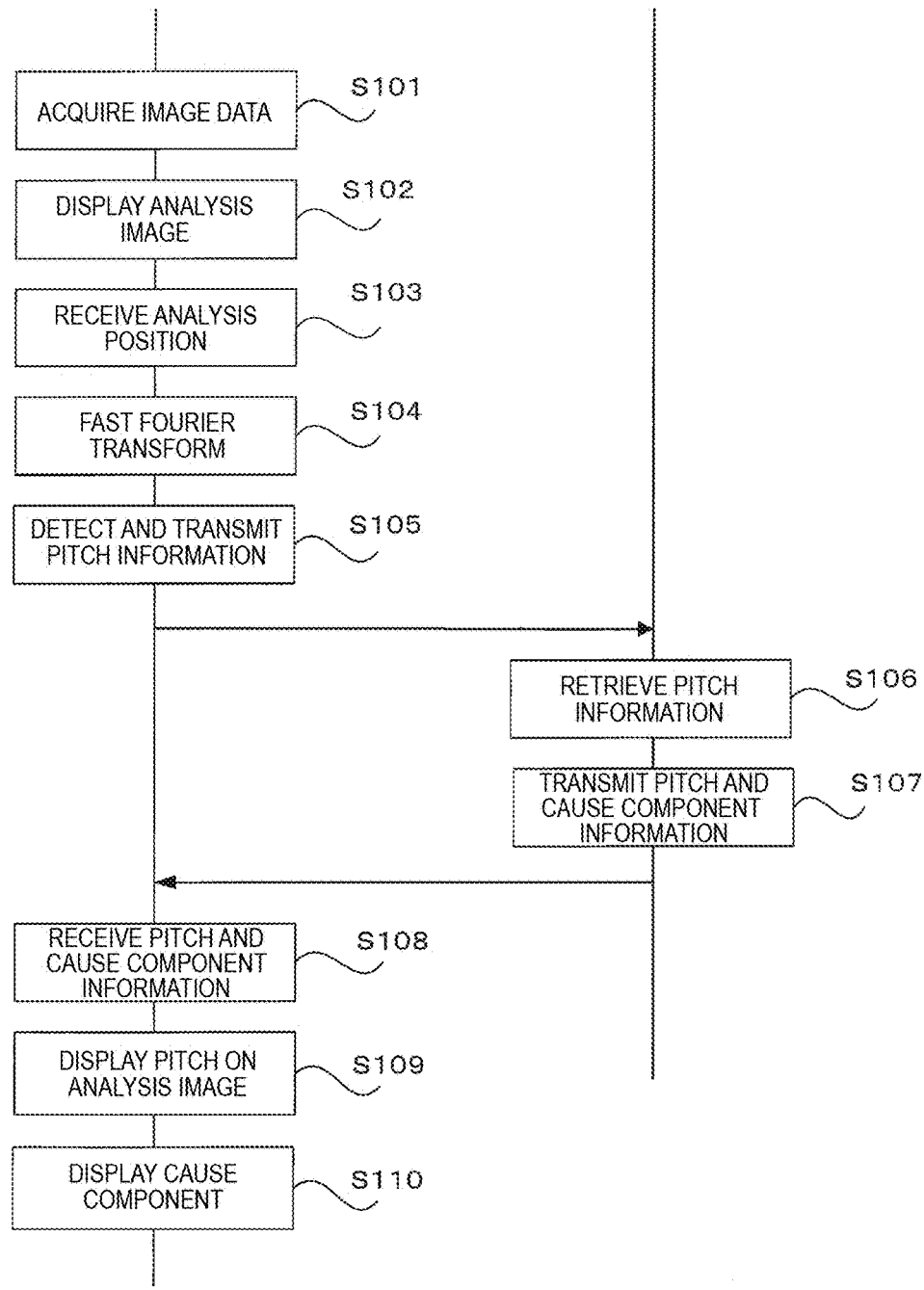
FIG. 6 is a flowchart illustrating an operation of a banding diagnosis system according to the exemplary embodiment of the invention.

Next, an operation of the banding diagnosis system according to the exemplary embodiment will be described with reference to the flowchart of FIG. 6 and instances of screens displayed on the display 42 of the terminal device 10 in FIGS. 7 to 12.

An image (print chart) painted with only one color of CMYK at a given concentration and output to a sheet by the image forming apparatus 14 serving as a target apparatus which is a measurement target in the terminal device 10 is used as an original, the image data obtained by causing the reading apparatus to read the print chart original is acquired in the terminal device 10, and a banding analysis process is executed.

Figure 7:
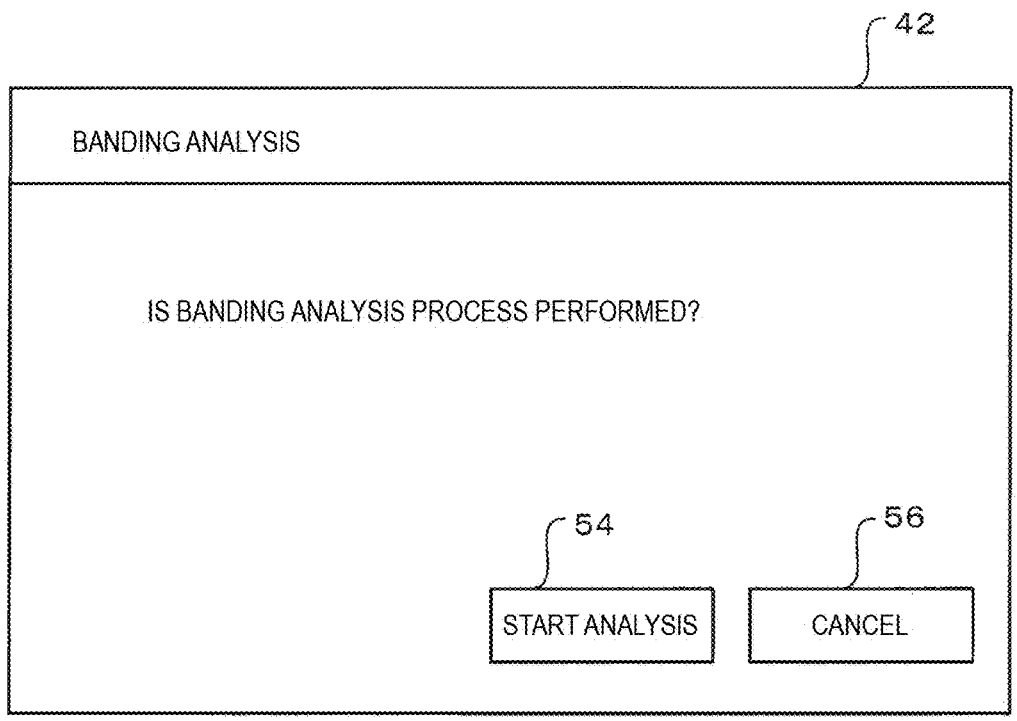
FIG. 7 is a diagram illustrating an instance of a screen displayed on a display 42 of the terminal device 10 according to the exemplary embodiment of the invention.

Specifically, the terminal device 10 has a function of executing the banding analysis process on the image data of each color of CMYK. Thus, when the banding analysis process is executed, as illustrated in FIG. 7, the display 42 displays a banding analysis execution screen.

An "analysis start" button 54 for starting the analysis and a "cancel" button 56 are displayed on the banding analysis screen. When the "cancel" button 56 is pressed, the banding analysis process is cancelled. When the "analysis start" button 54 is pressed, the image data acquisition section 34 acquires the image data of each color of CMYK (step S101), the banding analysis process is executed in sequence, a banding analysis image 1 illustrated in FIG. 8 is displayed on the display 42 (step S102).

Figure 8:
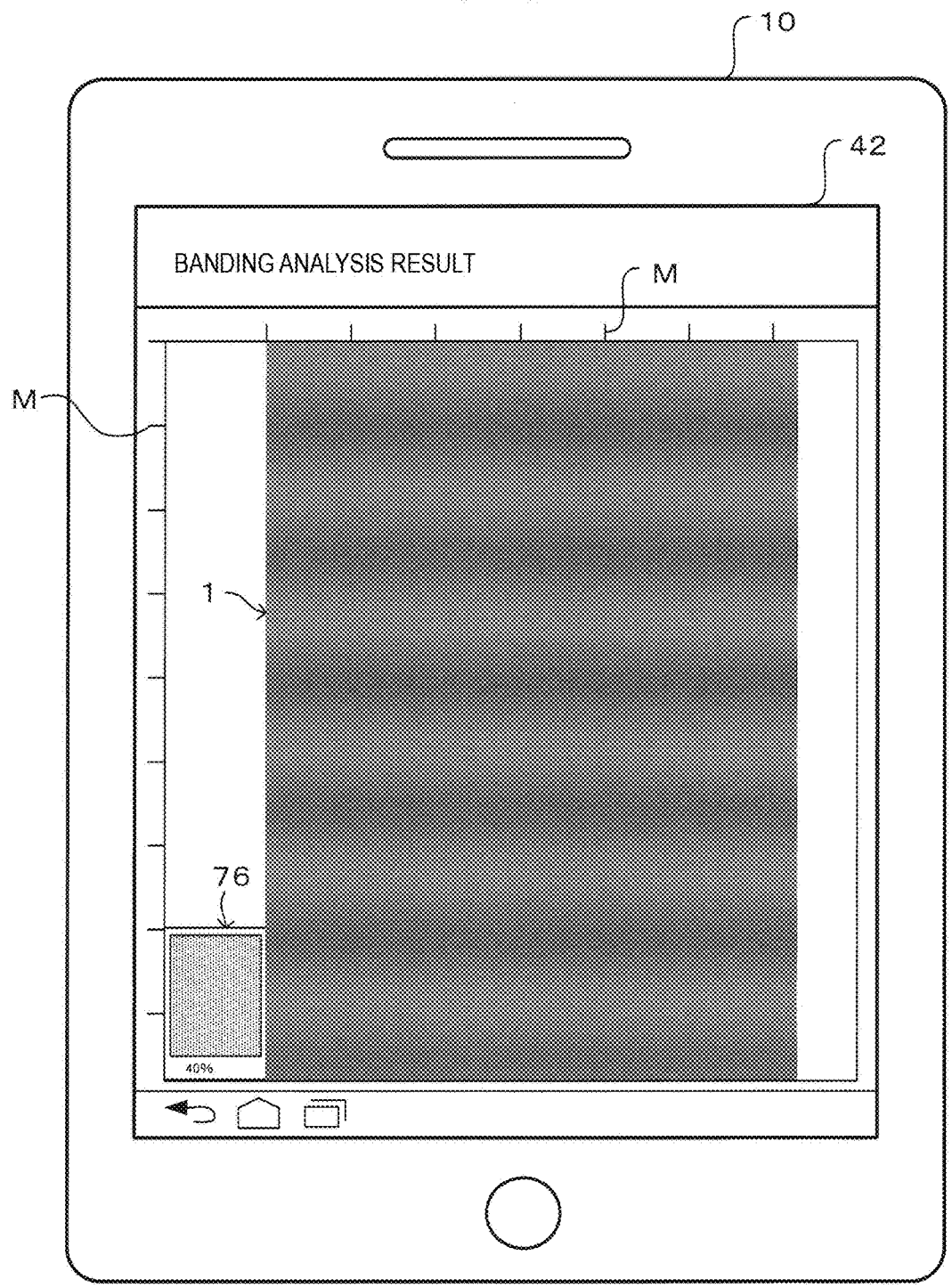
FIG. 8 is a diagram illustrating an instance of a banding analysis image (analysis result) displayed on the display 42 of the terminal device 10 according to the exemplary embodiment of the invention.
Figure 9:
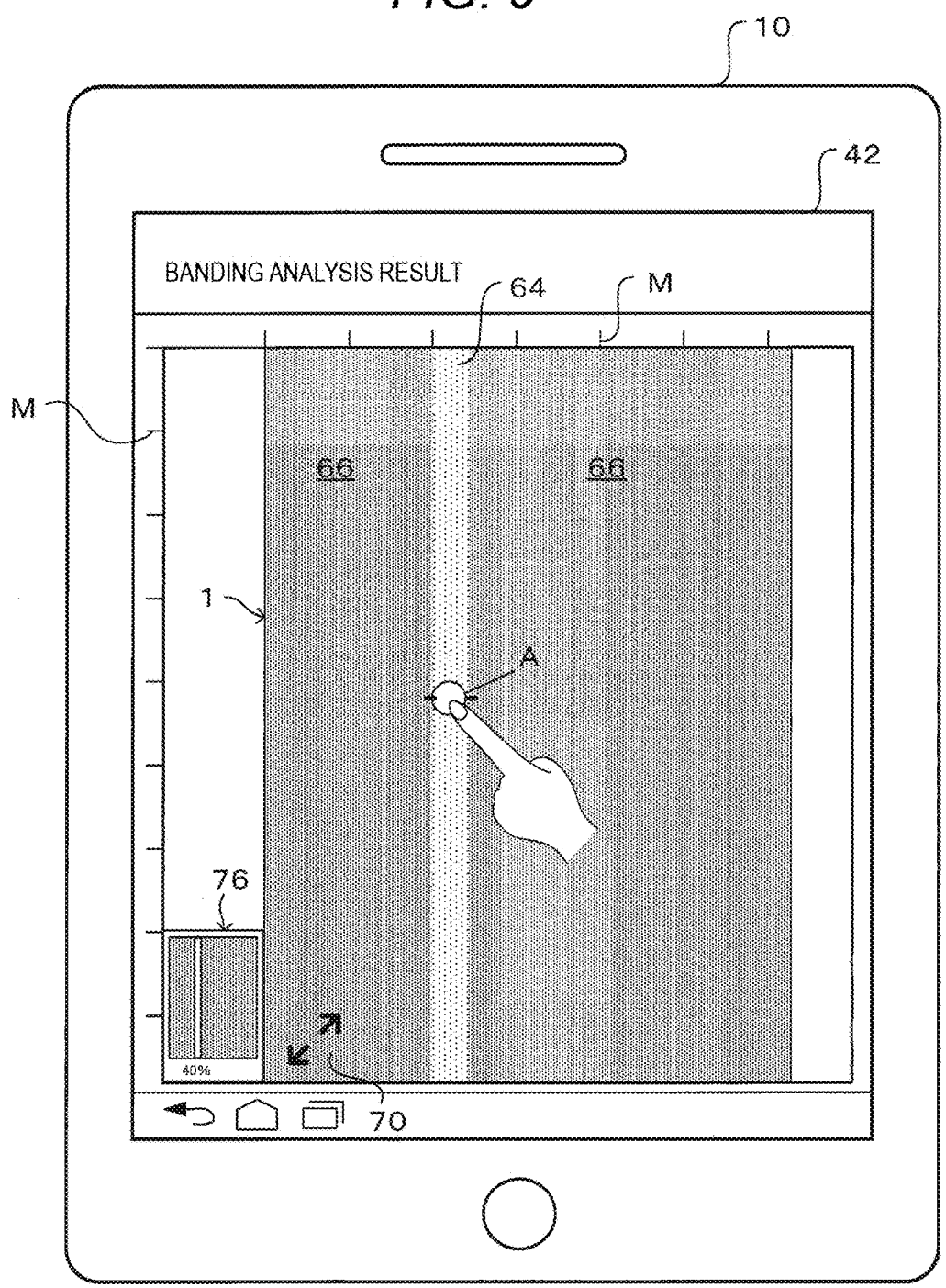
FIG. 9 is a diagram illustrating an instance of a display screen when a banding analysis position is designated by a user according to the exemplary embodiment of the invention.

In the banding analysis image 1 illustrated in FIG. 8, as illustrated in FIG. 9, when the user executes a touch operation at a spot at which image-quality unevenness is estimated to occur, the analysis position A is received (step S103). At this time, the designated region 64 which is a line containing the analysis position A on the display screen of the banding analysis image 1 and the undesignated regions 66 are displayed with gray scale in a mask manner, for instance.

As illustrated in FIG. 10, the fast Fourier transform is executed on the image data of the ranges (regions), the small range 100 containing the received analysis position A, the intermediate range 200 larger than the small range 100, and the large range 300 larger than the intermediate range 200 (step S104).

The pitch information is detected from the information regarding the frequencies and the periods of the ranges (regions) on which the fast Fourier transform is performed and the pitch information of the ranges is transmitted to the server apparatus 12 (step S105).

Then, in the server apparatus 12, information is retrieved in the pitch data storage section 50 based on the pitch information of the received image data (step S106).

Then, the server apparatus 12 transmits the information regarding the pitch, the cause component of banding, and the like retrieved based on the pitch information to the terminal device 10 (step S107).

Figure 11:
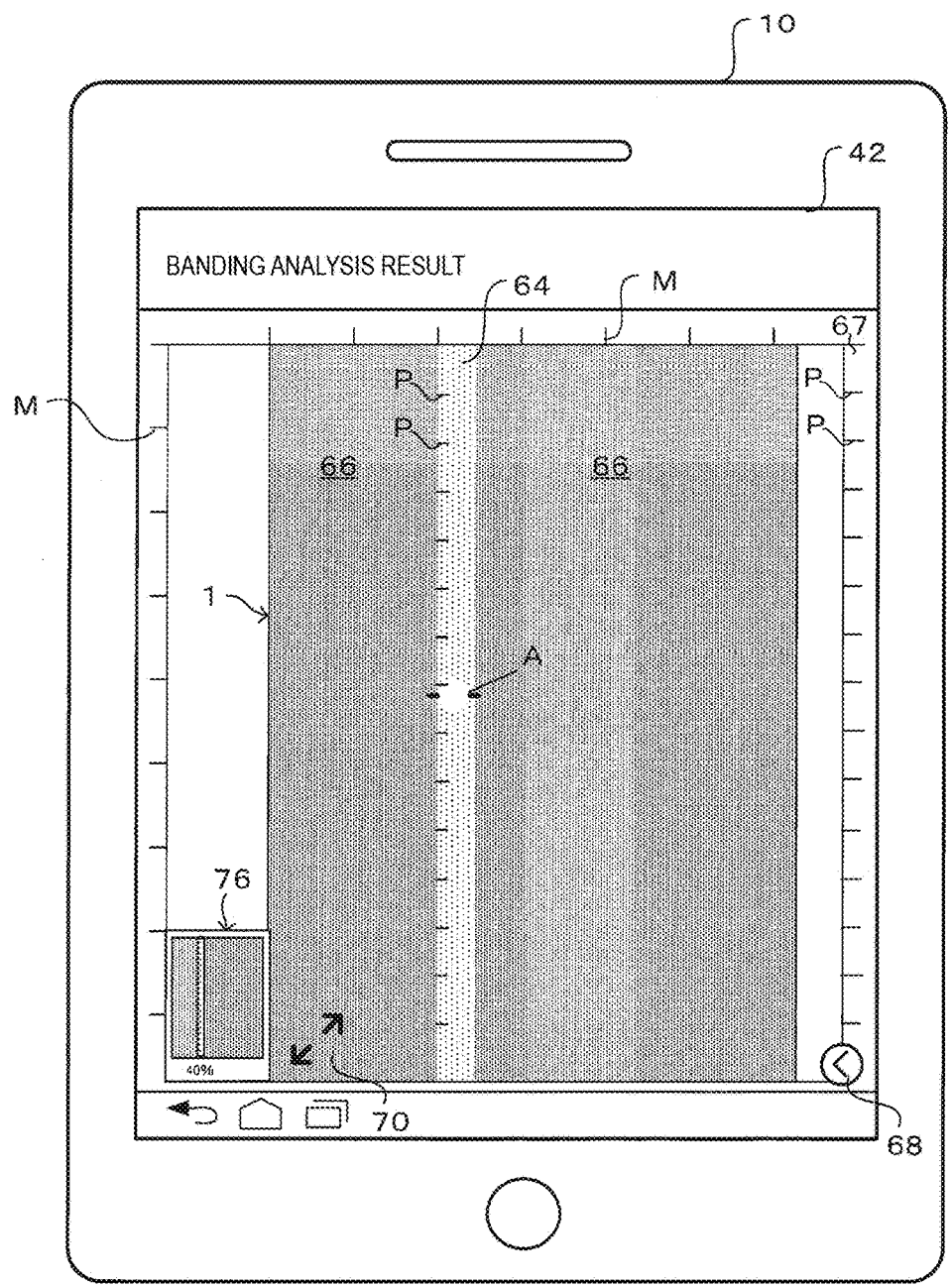
FIG. 11 is a diagram illustrating an instance of a display screen on which a banding analysis result is displayed according to the exemplary embodiment of the invention.

Then, the terminal device 10 receives the information regarding the pitch, the cause component of banding, and the like transmitted from the server apparatus 12 (step S108). As illustrated in FIG. 11, a pitch P detected on the designated region 64 of the banding analysis image 1 is repeatedly displayed (step S109). Here, the same pitch as the pitch P displayed in the designated region 64 is displayed in a pitch display region 67 at the end of the display 42. Scales M are displayed in the lateral direction (X axis direction) and the vertical direction (Y axis direction) in the circumference of the banding analysis image 1. Thus, the length of the pitch is viewed by comparing the scales M to the pitch P.

Figure 12:
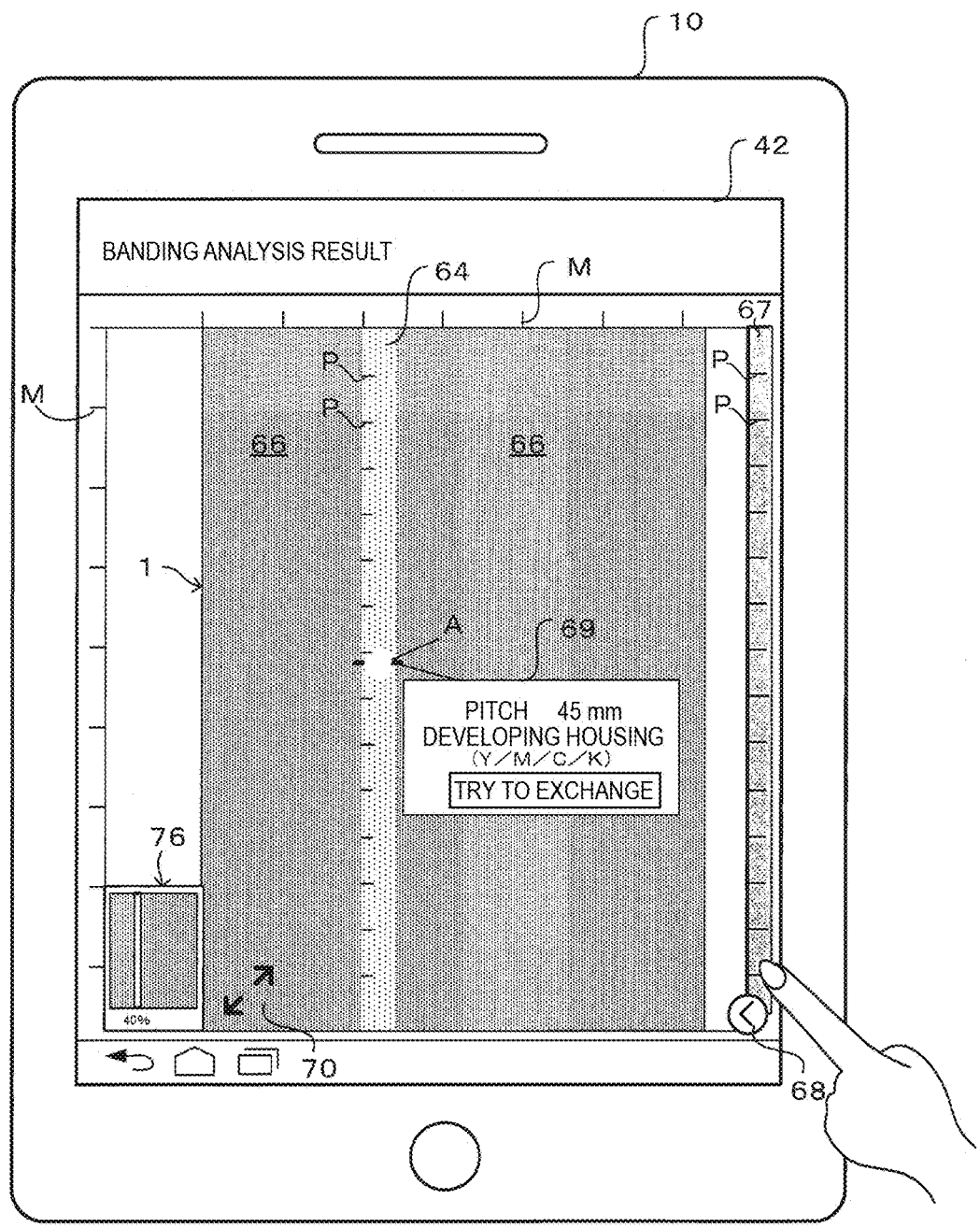
FIG. 12 is a diagram illustrating an instance of a display screen on which a banding analysis result is displayed according to the exemplary embodiment of the invention.

When the pitch P is repeatedly displayed on the designated region 64 and the pitch P displayed in the pitch display region 67 is further touched, as illustrated in FIG. 12, the cause component of banding transmitted based on the pitch information displayed in the pitch display region 67 is displayed in a pop-up manner in a component extraction and display portion 69 (step S110). FIG. 12 illustrates an image example in which the component extraction and display portion 69 is detected as a pitch of 45 mm from the analysis result in the frequency analysis section 36 and the cause of banding is extracted and displayed as a "developing housing" from the information stored in the pitch data storage section 50 of the server apparatus 12.

When a button "try to exchange" in the component extraction and display portion 69 is pressed, the analysis image, the analysis coordinates which are the analysis position, the analysis result, apparatus information, and the like are transmitted along with apparatus information from the terminal device 10 to the server apparatus 12 to be stored in the analysis data storage section 52. When the button for "try to exchange" is not pressed, only the analysis coordinates are transmitted along with the apparatus information to the server apparatus 12 to be stored in the analysis data storage section 52.

Next, examples of display screens used to describe an operation of the banding diagnosis system according to the exemplary embodiment of the invention will be described in more detail.

A development button 68 is displayed on the lower side of the pitch display region 67 of the display screen of the banding analysis image 1 of the terminal device 10. When the development button 68 is pressed on the display screen of FIG. 13A, plural pieces of other pitch information analyzed and detected at the analysis position A are displayed in the pitch display region 67, as illustrated in FIG. 13B. That is, the pitch information of other regions (ranges) of the analysis position A is displayed in parallel in the transport direction from the side of the banding analysis image in order from the component which has a higher possibility of being the cause of banding, for instance. By displaying the plural pitches in parallel in this way, the pitches are easily compared and a minute difference between the pitches is viewed. As illustrated in FIG. 13C, when the pitches are being displayed in the pitch display region 67 and, for instance, a pitch P2 is selected, the selected pitch P2 is repeatedly displayed in the designated region 64.

Figure 14:
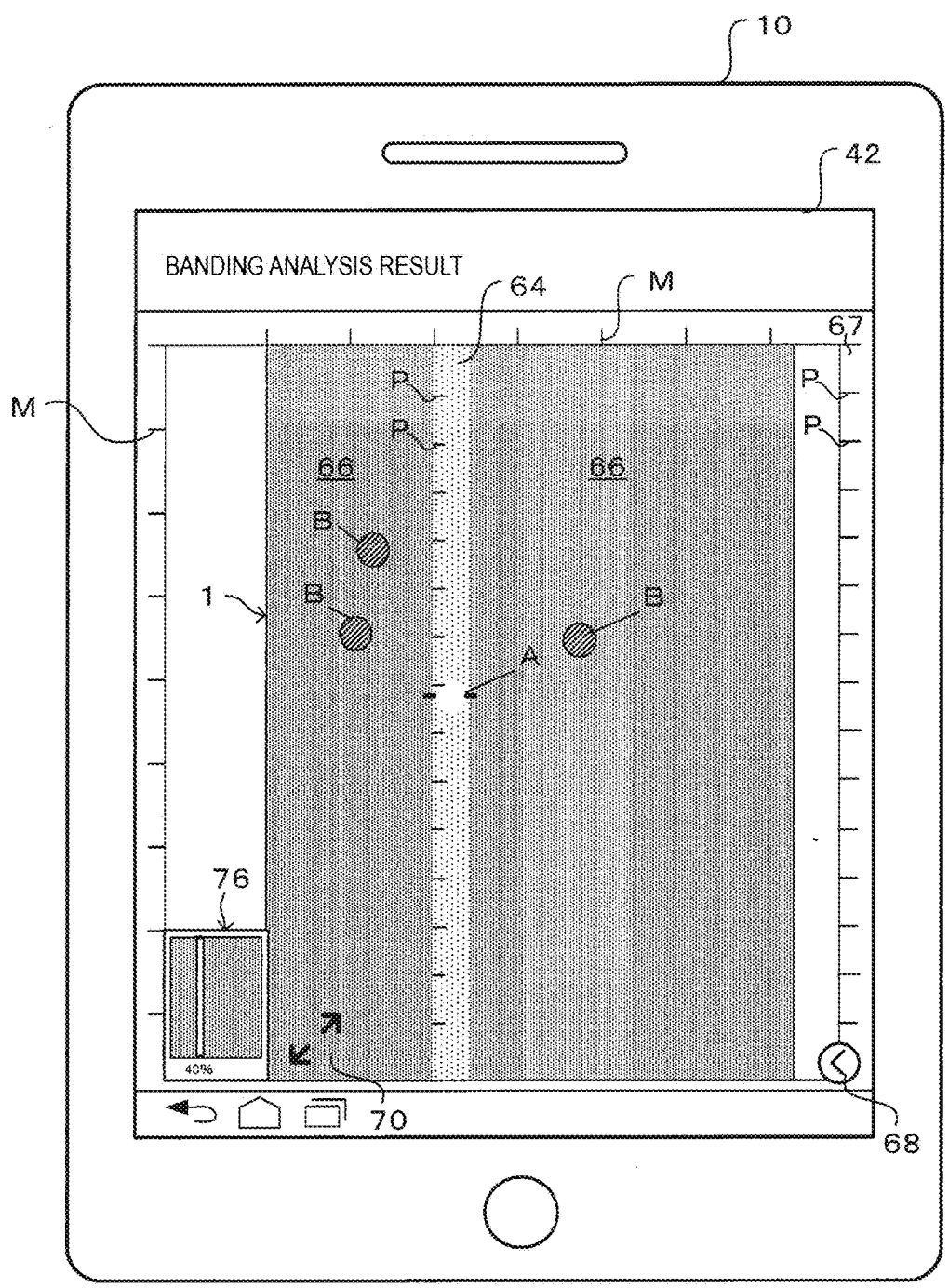
FIG. 14 is a diagram illustrating an instance of a display screen on which the banding analysis result is displayed and is a diagram illustrating an instance in which a previous analysis result is displayed as a history according to the exemplary embodiment of the invention.

FIG. 14 illustrates an instance in which history information of the banding analysis is displayed. Specifically, when an analysis history display button (not illustrated) is provided and the analysis history display button is pressed, data for requesting to transmit an analysis history is transmitted from the terminal device 10 to the server apparatus 12, information regarding a coordinate position B which is a previously acquired analysis position stored in the analysis data storage section 52, an analysis result at the coordinate position B, and an operation state of the apparatus at the time of analysis is extracted in the server apparatus 12, the information is transmitted to the terminal device 10, the previously analyzed coordinate position B is displayed with a different color from the analysis position A. When the coordinate position B is touched, a component extraction and display portion 69 which is an analysis result at the time coordinate position B is displayed in a pop-up manner. A banding analysis image at the coordinate position B or information regarding an operation state of the apparatus at the time of analysis may be displayed.

Figure 15:
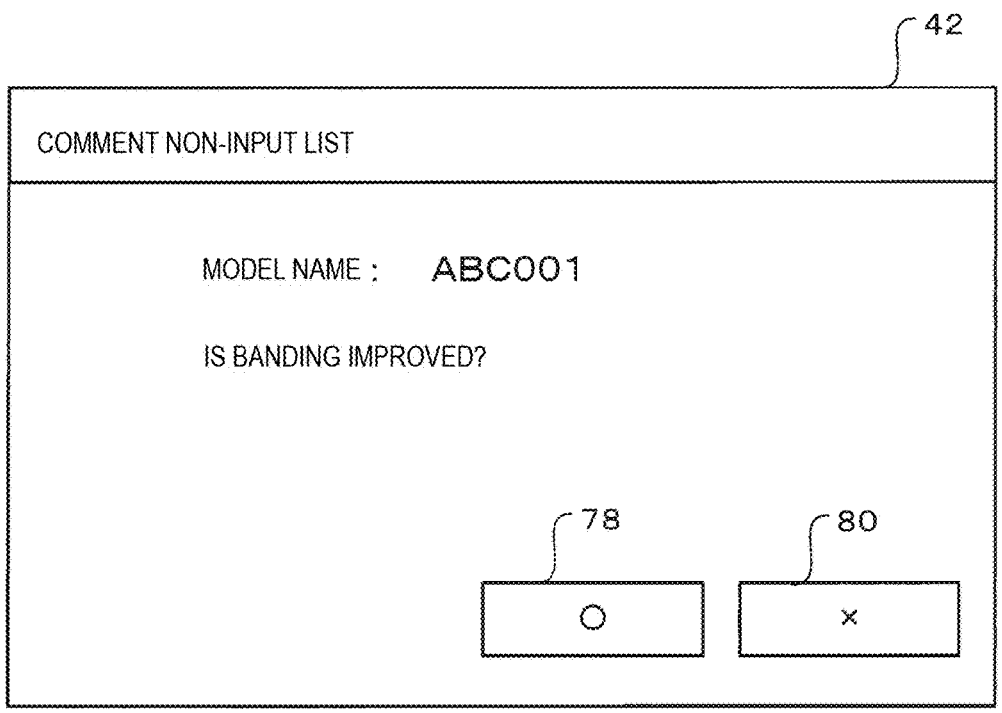
FIG. 15 is a diagram illustrating an instance of a screen displayed on the display 42 of the terminal device 10 and is a diagram illustrating an instance in which a comment is transmitted to the server apparatus 12 according to the exemplary embodiment of the invention.

FIG. 15 illustrates an instance of a screen displayed on the display 42 of the terminal device 10 when banding analysis is executed and a component is exchanged. Here, whether the banding is improved by exchanging the cause component specified by the banding analysis result in information regarding an analysis target apparatus is transmitted to the server apparatus 12. When the banding is improved, an "O" button 78 is pressed. When the banding is not improved, an "X" button 80 is pressed.

Figure 16:
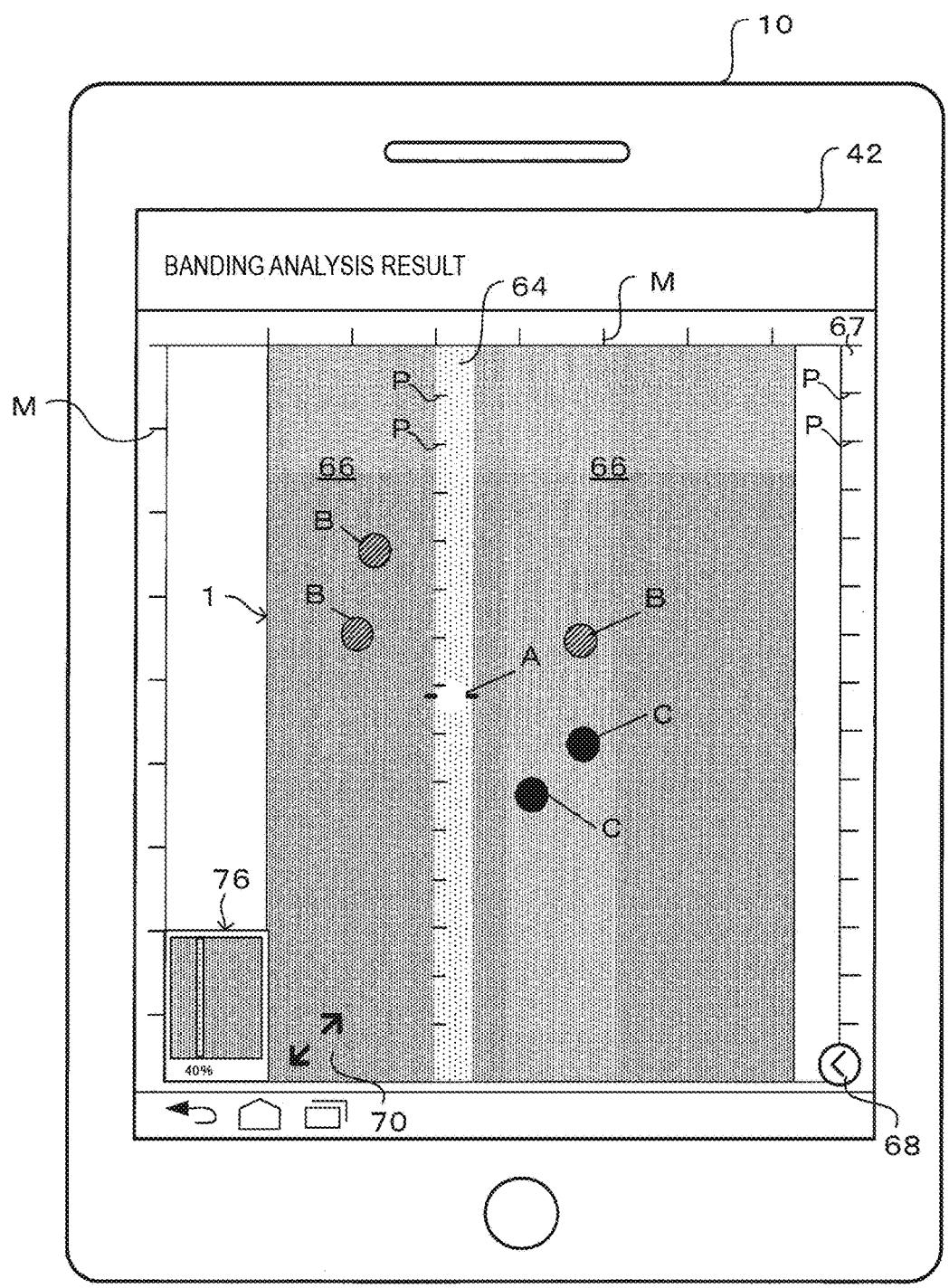
FIG. 16 is a diagram illustrating an instance of a display screen on which a banding analysis result is displayed and is a diagram illustrating an instance of a screen on which a previous analysis result is displayed as a history and which is displayed at a coordinate position at which "O" in FIG. 15 is input according to the exemplary embodiment of the invention.

When the "O" button 78 in FIG. 15 is pressed, a coordinate position C which is an analysis position at which the "O" button 78 is pressed among the previously analyzed analysis positions (coordinate positions) is displayed with a different color from the analysis position A and the coordinate position B, as illustrated in FIG. 16, at the time of display of the history information of subsequent banding analysis. The coordinate position C may be displayed in an emphasis manner. That is, since the analysis result is matched at the coordinate position C, the display can be clarified and analysis priority of the data can be raised. The invention is not limited to the case in which whether the banding is improved is transmitted to the server apparatus 12, but an analysis position when the user determines that there is a high possibility of being a cause of banding may be clarified and the stored data may be selected.

Figure 17:
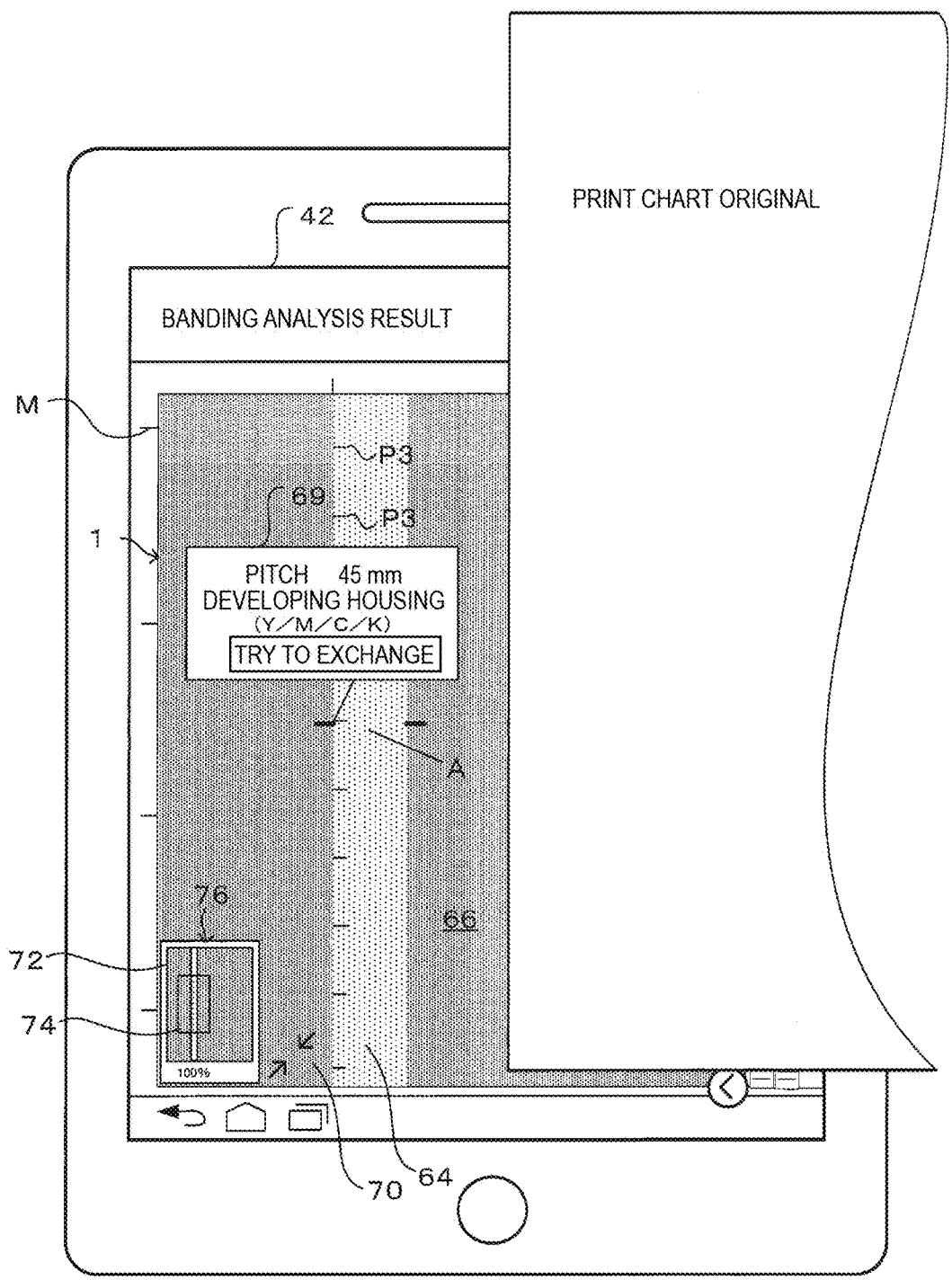
FIG. 17 is a diagram illustrating an instance of a display screen on which a banding analysis result is displayed and is a diagram when screen display is set as actual size display according to the exemplary embodiment of the invention.

The entire original read by the reading apparatus is displayed on the display 42. However, by pressing an equivalent size button 70 displayed on the banding analysis image, as illustrated in FIG. 17, a banding analysis result of the display 42 can be displayed with an actual size equivalent to the size of the print chart original. Accordingly, the banding analysis image 1 and the actual print chart original are compared to be viewed. At this time, a touch lock button (not illustrated) is provided to stop a touch function (operation function) so that the terminal device 10 does not erroneously operate when the display 42 is erroneously touched. At this time, a movement lock button (not illustrated) is provided to cause the display position of the banding analysis image 1 not to be moved horizontally and vertically.

Figure 18:
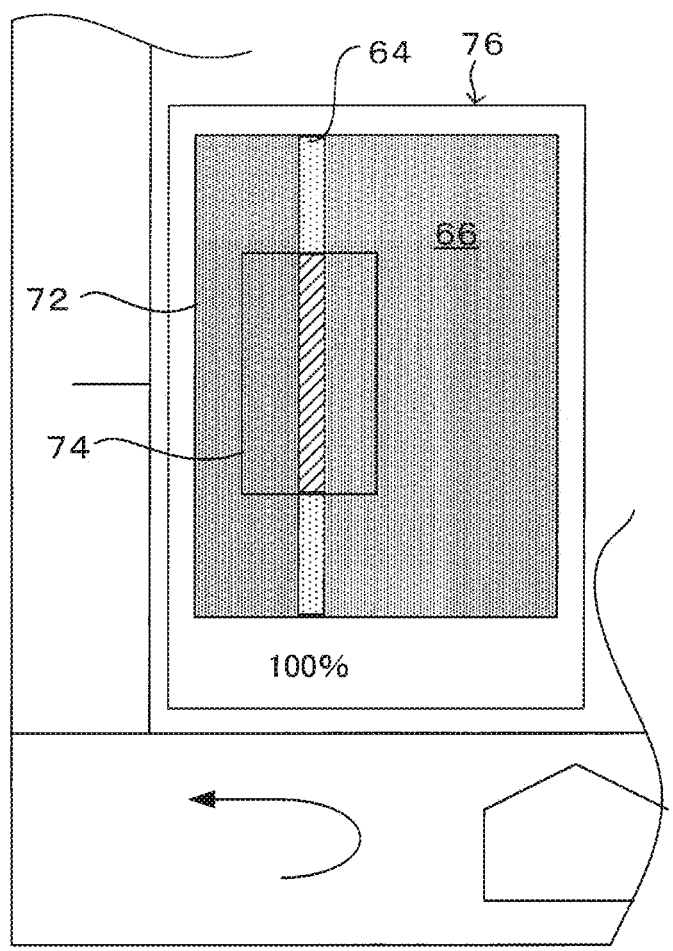
FIG. 18 is an expanded diagram illustrating the periphery of an area display portion 76 of a banding analysis result according to the exemplary embodiment of the invention.

As illustrated in FIGS. 17 and 18, the display 42 displays an area display portion 76 in which a selection range 74 indicating a display range of the display 42 in an entire region 72 containing the designated region 64 of the banding analysis image and the undesignated regions 66 is displayed. The selection range 74 is displayed to be partitioned by a frame in the entire region 72. Accordingly, a region in which the analysis result is displayed with respect to the print chart original is viewed.

Figure 19:
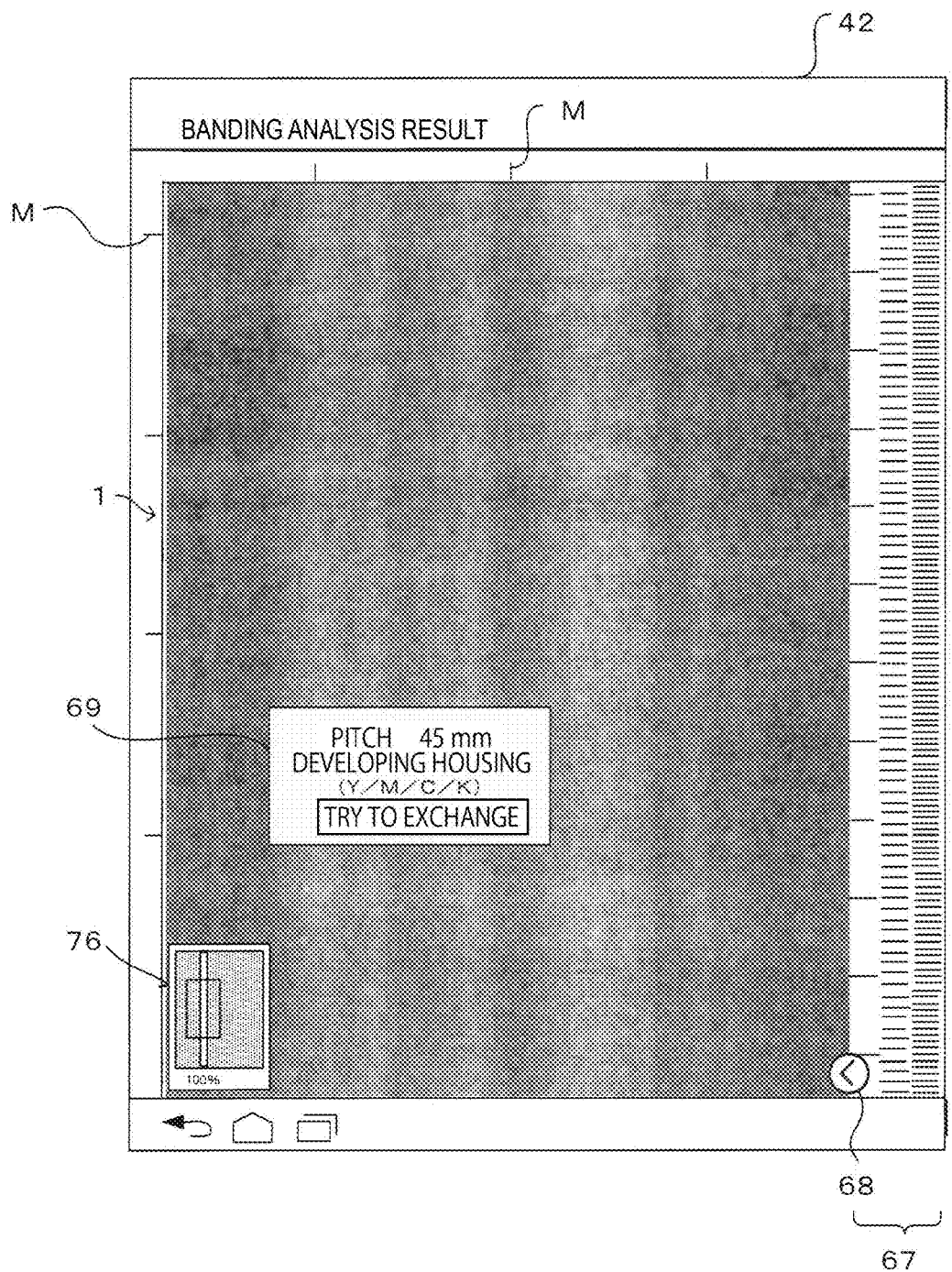
FIG. 19 is a diagram illustrating an instance of a display screen on which a banding analysis result is displayed and is a diagram illustrating emphasized and displayed shade of banding according to the exemplary embodiment of the invention.

As illustrated in FIG. 19, the shade of the banding analysis image (banding analysis result) can be adjusted to be displayed on the display section 42. Specifically, there is provided a contrast switch button (not illustrated) displayed in an emphasis mode in which, for example, the contrast of the banding analysis image is emphasized and black and white display by saturation 0 is realized for easy view. When the contrast switch button is pressed, the original banding analysis image and the emphasis mode are switched to be displayed.

Modification Example

In the foregoing embodiment, the case in which the operation based on the pitch information detection is executed on the side of the server apparatus 12 has been described, but the invention is not limited thereto. The operation may be executed on the side of the terminal device 10.

In the foregoing embodiment, the case in which the terminal device 10 is a table terminal device has been described, but the invention is not limited thereto. For instance, when an operation panel of the image forming apparatus 20 is configured to be attachable/detachable to/from a main body and communicable with the server apparatus 12, and have a built-in image information acquiring function, the operation panel may be used as a terminal device.

In the foregoing embodiment, the fast Fourier transform is executed on the small range 100 centering on the analysis position A, the intermediate range 200, and the large range 300 in the designated region 64 to extract the information regarding the frequencies and the periods, but the invention is not limited thereto. The information may be extracted in one region or two regions, or may be extracted in three or more divided regions.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal device comprising:
an acquiring unit configured to acquire image information;
a displaying unit configured to display the image information acquired by the acquiring unit;
a receiving unit configured to receive an analysis position of image-quality unevenness in the image information displayed by the displaying unit;
at least one central processing unit configured to implement a detecting unit and a controlling unit:
the detecting unit configured to detect pitch period information by performing frequency analysis of the analysis position received by the receiving unit, the pitch period information being detected by analyzing the frequency in the transport direction in which the image region was formed in a specified region defined by a length in the transport direction and a width corresponding to the received analysis position, the length being larger than the width, and wherein the specified region contains the analysis position;
the controlling unit configured to control the displaying unit to display the pitch period information detected by the detecting unit; and
a storing unit configured to store, as history information, the image information and the pitch period information in association with the analysis position, wherein
the controlling unit is configured to control the displaying unit to display the analysis position stored in the storing unit.

2. The terminal device according to claim 1, wherein
the controlling unit controls to display the pitch period information based on the analysis position stored in the storing unit when the analysis position displayed on the displaying unit and stored in the storing unit is selected by an operator.

3. The terminal device according to claim 1, wherein the controlling unit controls to display the analysis position stored in the storing unit in a color different from that of a present analysis position.

4. The terminal device according to claim 2, wherein the controlling unit controls to display the analysis position stored in the storing unit in a color different from that of a present analysis position.

5. A diagnosis system comprising:

an acquiring unit configured to acquire image information;

a displaying unit configured to display the image information acquired by the acquiring unit;

a receiving unit configured to receive an analysis position of image-quality unevenness in the image information displayed by the displaying unit;

at least one central processing unit configured to implement a detecting unit and a controlling unit:

the detecting unit configured to detect pitch period information by performing frequency analysis of the analysis position received by the receiving unit, the pitch period information being detected along a length in a transport direction in which the image information was formed in a specified region defined by the length in the transport direction and a width corresponding to the received analysis position, the length being larger than the width, and wherein the specified region contains the analysis position;

the controlling unit configured to control the displaying unit to display the pitch period information detected by the detecting unit; and a storing unit configured to store, as history information, the image information and the pitch period information in association with the analysis position, wherein the controlling unit is configured to control the displaying unit to display the analysis position stored in the storing unit.

6. A non-transitory computer readable medium storing a program causing a computer to execute a process comprising:

acquiring image information;

displaying the acquired image information;

receiving an analysis position of image-quality unevenness in the displayed image information;

detecting pitch period information by performing frequency analysis of the received analysis position, the pitch period information being detected along a length in a transport direction in which the image information was formed in a specified region defined by the length in the transport direction and a width corresponding to the received analysis position, the length being larger than the width, and wherein the specified region contains the analysis position;

displaying the detected pitch period information;

storing, as history information, the image information and the pitch period information in association with the analysis position; and displaying the stored analysis position.

* * * * *